L. M. PERKINS.
CONTROL SYSTEM.
APPLICATION FILED MAY 15, 1917.

1,335,127.

Patented Mar. 30, 1920.

WITNESSES:
Fred A. Lind.
W. C. McCoy.

INVENTOR
Laurence M. Perkins
BY
Wesley L. Carr
ATTORNEY

UNITED STATES PATENT OFFICE.

LAURENCE M. PERKINS, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,335,127.  Specification of Letters Patent.  Patented Mar. 30, 1920.

Application filed May 15, 1917. Serial No. 168,660.

*To all whom it may concern:*

Be it known that I, LAURENCE M. PERKINS, a citizen of the United States, and a resident of Wilkinsburg, in the county of Allegheny and State of Pennsylvania, have invented a new and useful Improvement in Control Systems, of which the following is a specification.

My invention relates to control systems for alternating-current commutator motors and it has for its object to provide a simple and reliable control system of the character indicated whereby an improved operation of the motors may be secured.

Figure 1:
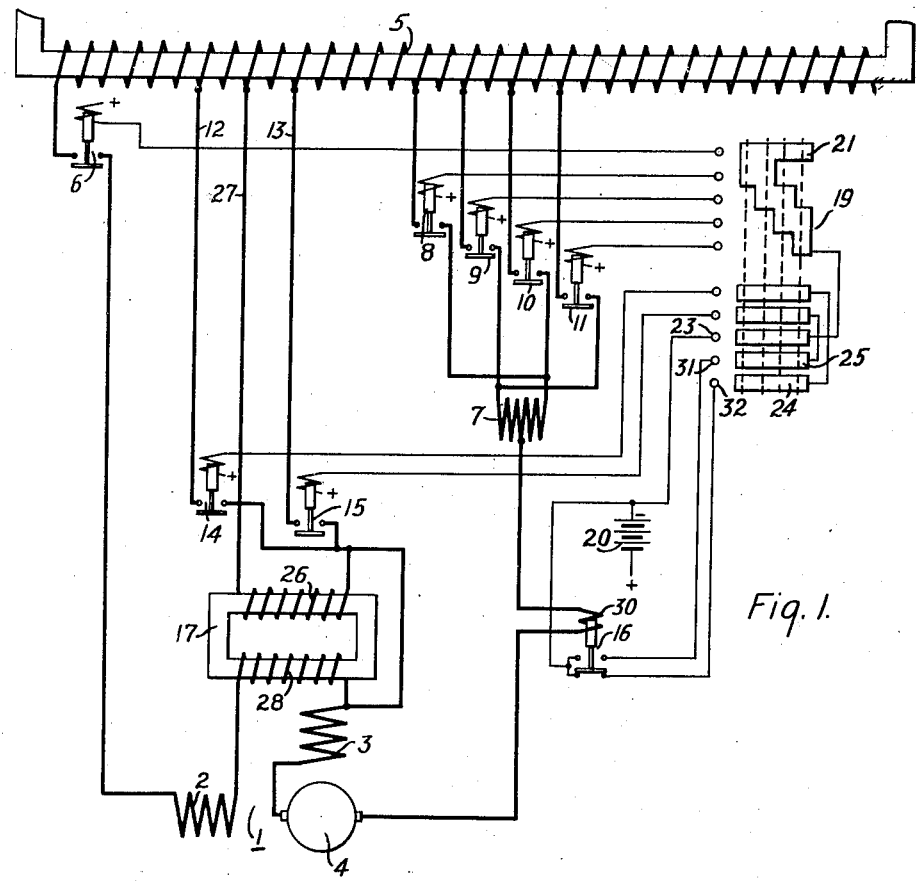
Figure 2:
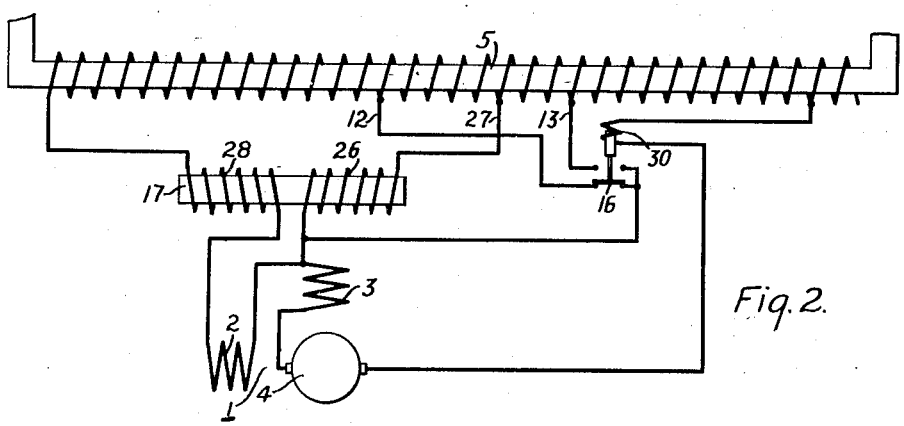

Figure 1 of the accompanying drawing is a diagrammatic view of a single-phase motor control system constructed in accordance with my invention, and Fig. 2 is a simplified diagrammatic view of the circuit connections in a slightly modified system.

It is familiar practice to impress a high voltage upon the inducing-field winding of a single-phase motor when starting, and to materially decrease this voltage and increase the voltage impressed upon the armature winding after the motor has reached certain operating conditions. Such means as have heretofore been proposed for accomplishing these results have changed the voltages impressed upon the respective portions of the motor circuits by substantially the same amounts, or have employed a separate switch in each circuit on which the impressed voltage is changed.

In accordance with my invention I provide an auxiliary transformer, one coil of which is connected in series-circuit relation with the inducing-field winding and the other coil of which is energized from a main supply-circuit transformer, by means of which the impressed armature voltage is varied by an amount that is different from the amount by which the inducing-field voltage is changed. The voltage impressed upon the exciting coil of the auxiliary transformer is adapted to be automatically reversed under certain operating conditions to reverse the voltage of the secondary winding of the auxiliary transformer and to subtract this voltage from the voltage that is impressed upon the inducing-field winding circuit of the motor instead of adding the same as in the initial connection. This change is accomplished by changing the point of connection of a single supply-circuit tap. Furthermore, I propose a system in which the effective armature voltage and the main motor flux can be maintained substantially constant while the inducing or compensating field flux is altered to any desired degree.

Referring to the drawing for a more complete understanding of my invention, an alternating-current commutator motor 1, comprising an inducing field winding 2, an exciting or magnetizing field winding 3, and an armature winding 4, is adapted to be operated by energy supplied from a suitable source such as a transformer winding 5. Voltage is applied to the outer inducing-field winding terminal by means of a switch 6. The voltage applied to the outer armature terminal of the motor may be adjusted by means of a preventive coil 7 and a plurality of switches 8 to 11, inclusive, in a familiar manner. A circuit may be established from an intermediate tap 12 or 13 through a corresponding switch 14 or 15 to one terminal of the magnetizing-field winding 3. The inducing-field winding 2 is connected to the transformer winding 5 by means of switches 6, 14, and 15, a relay 16 and an auxiliary transformer 17, as will be hereinafter more fully set forth. For the purpose of simplicity and clearness of illustration, I have shown the switches 6, 8, 9, 10, 11, 14 and 15 as of the electrically operated type under the control of a controller 19 which may be manually or automatically operated. The return leads of the energizing coils for the various switches have been omitted and the character + applied to a terminal of each of the energizing coils and to one terminal of a control battery 20 to indicate that the correspondingly marked terminals of the energizing coils and the battery should be connected in accordance with familiar practice. A main contact segment 21 of the controller 19 is directly energized by the battery 20 through a contact finger 23. The controller 19 is also provided with a plurality of separate auxiliary contact segments 24 and 25 that are energized in accordance with the position of the relay 16 as will be hereinafter more fully set forth.

The auxiliary transformer 17 comprises a primary coil 26, one terminal of which is connected to the supply transformer 5 by a tap 27 and the remaining terminal of which is connected either to tap 12 or to tap 13 in accordance with the position of the relay 16. A secondary coil 28 of the auxiliary transformer 17 is connected in series-circuit relation with the inducing-field winding 2 and it aids or opposes the voltage that is impressed upon the field winding by the transformer 5 in accordance with the arrangement of connections of the primary coil 26.

The relay 16 is actuated to an upper or a lower position by means of a coil 30 in accordance with the current flowing through the armature winding 4 of the motor 1. When the relay 16 occupies its uppermost position, corresponding to an armature current that is larger than a predetermined amount, the control segments 25 are energized from the contact finger 31 and the switch 15 is closed. The control segments 24 are energized from a contact finger 32 when the motor current decreases to a predetermined small value preferably corresponding to a normal operating current of the motor. The switches 14 and 15 are respectively energized from the control segments 24 and 25 in such manner that when the relay 16 is in a raised position the switch 15 is closed and when the relay 16 is in its normal or lowermost position the switch 14 is closed. Changing the connections to the primary coil 26 by means of the switches 14 and 15 changes the direction of energization of the coil and, therefore, changes the direction of the voltage that is impressed by the coil 28 upon the circuit for the inducing-field winding 2.

The inducing-field winding 2 preferably has twice as many turns as the armature winding 4, as is usual in doubly-fed motor practice, and the transformer 17 preferably has the same number of turns in the primary coil 26 as in the secondary coil 28. The reason for these relations is that it is desirable to maintain a substantially constant effective armature voltage and magnetizing field flux for any given load current and to provide an adjustable compensating field flux that may be independently varied to secure the best spark compensation for that particular load current. By the term "effective armature voltage" is meant the voltage that is directly impressed upon the armature working circuit from a source of current supply and the voltage that is developed within the armature winding by transformer action from the inducing or compensating field winding 2. It will be understood that, since the change in the voltage directly impressed upon the armature winding from the transformer winding 5 by changing the point of connection of the magnetizing-field lead from tap 13 to tap 12 is accompanied by a change of substantially twice the amount in the circuit for the inducing-field winding, the effective armature voltage will be maintained substantially constant and the inducing-field flux will be varied in accordance with the voltage that is impressed upon the field winding 2. The speed of the motor will therefore remain substantially constant for any given load and the inducing field flux may be altered to any degree in order to secure the best spark-compensating voltage.

In order to operate such a motor as I have described, the controller 19 is advanced to the first position in which switches 6, 8, 9 and 14 are closed. This establishes a familiar doubly-fed circuit arrangement. The initial rush of current through the armature winding 4 lifts the relay 16 to its uppermost position and opens the switch 14 and closes the switch 15, thus changing the direction of the voltage impressed upon the inducing-field winding circuit 2 by the transformer winding 28. Since the voltage from the winding 28 is added to the voltage that is impressed upon the circuit for the inducing winding 2 from the transformer winding 5, the motor is started into operation with a heavy inducing-field flux. Further movement of the controller 19 connects the preventive coil 7 to the transformer winding 5 first through the switches 9 and 10 and then through the switches 10 and 11, thus increasing the voltage that is applied across the armature winding from the transformer winding 5 as the motor speed increases. If, however, the current through the motor decreases to a predetermined small value, by reason of a certain operating speed being reached, or from other causes, the relay 16 will move to its lowermost position and interrupt the circuit through the switch 15 and establish a circuit through the switch 14. This change in the circuit connections reverses the direction of the voltage that is impressed upon the exciting coil 26 of the auxiliary transformer 17 and also changes the direction of the increment of voltage that is impressed upon the inducing-field winding circuit from the coil 28, as hereinbefore explained. The effective armature voltage is maintained constant for this circuit change since the decrease in voltage directly applied to the armature circuit is made up by voltage induced into the armature winding from the inducing-field winding 2. This change will therefore entail no change in speed or motor current if the various windings are constructed with the relations of the numbers of turns hereinbefore recited. It should be understood that the relay 16 does not operate for any given position of the controller 19 but is operated in accordance with the current flowing through the armature winding 4 and may be in either its uppermost or its lowermost position for any operating position of the controller.

If the number of turns in the inducing-field winding bear a ratio other than 2 to 1 to the number of turns in the armature winding, it is desirable to vary the relative numbers of turns in the windings 26 and 28 so that the effective armature voltage will be maintained substantially constant for the various connections of the transformer winding 26. Thus, if the inducing-field winding have three times as many turns as the armature winding, the armature voltage will be changed by one-third the amount that the inducing-field winding voltage is changed and, therefore, the coil 28 should impress a voltage of two-thirds of the amount by which the armature impressed voltage is changed, in order to maintain a constant effective armature voltage. In more general terms, if the winding 2 have $n$ times as many turns as the winding 4, the transformer coil 28 should have $n-1$ times as many turns as the primary coil 26.

Fig. 2 is a schematic diagram of the motor circuit connections as they are established for any given step in the acceleration of a motor 1 in a control system slightly modified from that shown in Fig. 1. For the sake of clearness in illustrating and ease in describing the apparatus, the auxiliary transformer 17 is shown as being wound on a straight core. Although the secondary coil 28 of the transformer is positioned on the remote side of the inducing-field winding 2, this is not a material alteration of the circuit and is used for its convenience only. This diagram also represents the relay 16 as directly establishing the main motor circuits without such interposed auxiliary switches as 14 and 15 shown in Fig. 1.

My system of control as herein described is capable of various modifications in the control circuits without departing from the spirit and scope of my invention. I desire therefore that only such modifications shall be imposed as are indicated in the appended claims.

I claim as my invention:

1. The combination with an alternating-current commutator motor comprising an inducing-field winding and an armature winding, of a unity-ratio transformer having one winding interposed in series-circuit relation with said inducing-field winding and having another winding in circuit with both windings of the motor, and means responsive to the current through said armature winding for reversing the electromotive force of said transformer to maintain a substantially constant effective armature voltage under predetermined speed-regulating conditions.

2. The combination with an alternating-current commutator motor comprising a stator-field winding and an armature winding, connected in circuit with said stator winding, of a transformer for supplying energy to said motor, an adjustable tap connected to said transformer and interposed between said windings, transformer means for supplying an auxiliary electromotive force to the motor circuit, and means for changing the point of connection of said tap to reverse the auxiliary electromotive force of said transformer.

3. The combination with an alternating-current commutator motor comprising a stator-field winding, and an armature winding, of a source of energy supply across which said motor is connected, an auxiliary source of energy supply interposed in said motor circuit, and means responsive to predetermined current conditions for reversing the electromotive force of said auxiliary source of energy supply.

4. The combination with an alternating-current commutator motor comprising an inducing-field winding and an armature winding, of a supply-circuit transformer to which the said windings are connected in series-circuit relation, an adjustable tap to said transformer from the point of connection of said windings, an auxiliary transformer having a primary winding and a secondary winding, said secondary winding connected in series relation with said inducing-field winding, said primary winding having one end connected to said first-named transformer and the other end connected to said tap, and means dependent upon the operation of said motor means for reversing the electromotive force of said secondary winding by changing the point of connection of said tap.

5. The combination with an alternating-current commutator motor comprising series-connected stator and armature windings, of a supply-circuit transformer for impressing certain voltages upon portions of said winding circuit, an auxiliary transformer, relay means governed by motor conditions, and means including said auxiliary transformer and said relay means for automatically varying the voltages impressed upon said respective portions by materially different amounts.

6. The combination with a doubly-fed motor having "$n$" times as many inducing-field turns as armature turns, of a source of alternating current, an adjustable tap for connecting a point between the inducing-field winding and the armature winding to said source of alternating current, and an auxiliary transformer having $n-1$ times as many secondary turns as primary turns, the secondary winding of said transformer being connected in series-circuit relation with the inducing-field winding, one terminal of said primary winding being permanently connected to said source of alternating current and the remaining terminal of said primary winding being connected to said adjustable tap.

7. The combination with an alternating-current commutator motor comprising a stator-field winding and an armature winding connected in circuit with said stator winding, of a transformer for supplying energy to said motor, a unity-ratio transformer having one winding connected in series-circuit relation with said stator field winding and having another winding connected in circuit with both windings of the motor, and means responsive to the operation of said motor for reversing the direction of the electromotive force of said unity-ratio transformer to maintain a substantially constant effective armature voltage under predetermined current conditions.

8. The combination with an alternating-current commutator motor comprising a stator-field winding having substantially twice as many turns as the armature winding, of a source of alternating-current, a unity-ratio transformer connected in circuit with said stator-field winding, and means dependent upon the current traversing said armature winding for reversing the electromotive force of said transformer.

9. The combination with an alternating-current commutator motor comprising a stator field winding and an armature winding, of a transformer winding having a plurality of taps for supplying energy to said motor, an auxiliary transformer having one winding connected in series relation with said stator winding and another winding connected between one of said taps and a point intermediate said motor windings, and means responsive to the current traversing the armature winding for adjusting the tap connections to reverse the electromotive force of the auxiliary transformer.

In testimony whereof I have hereunto subscribed my name this 30th day of April, 1917.

LAURENCE M. PERKINS.